April 6, 1937.  A. B. WOOD ET AL  2,076,330
MEASUREMENT OF DISTANCES BY ECHO RECEPTION METHODS
Filed Jan. 26, 1932  3 Sheets-Sheet 3
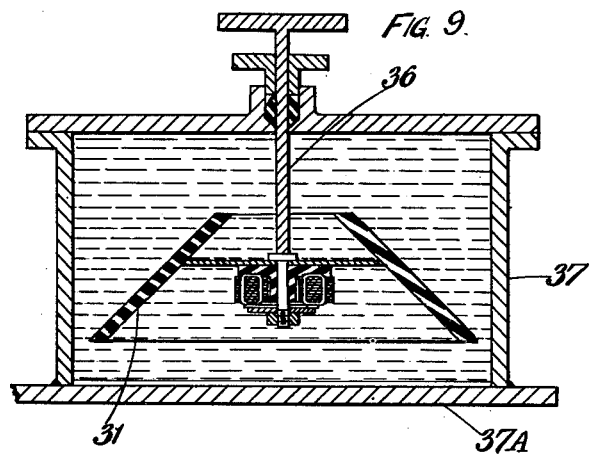
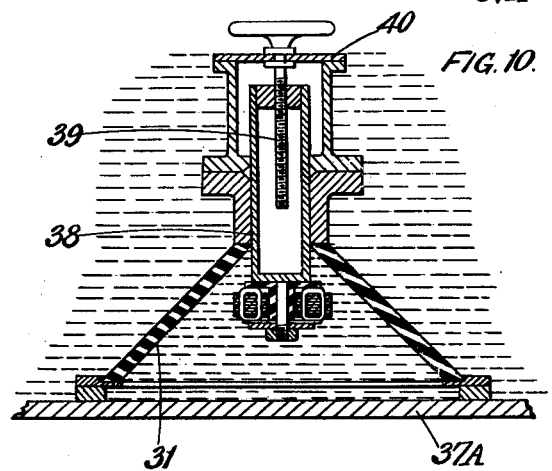
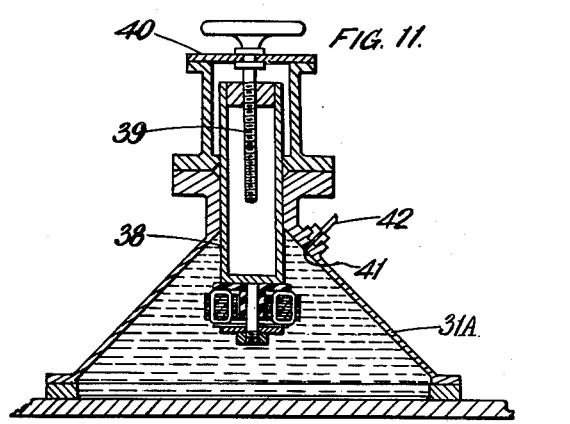
Inventors
A. B. Wood
F. D. Smith
and J. H. McGeachy
by Wilkinson & Mawhinney
Attorneys.

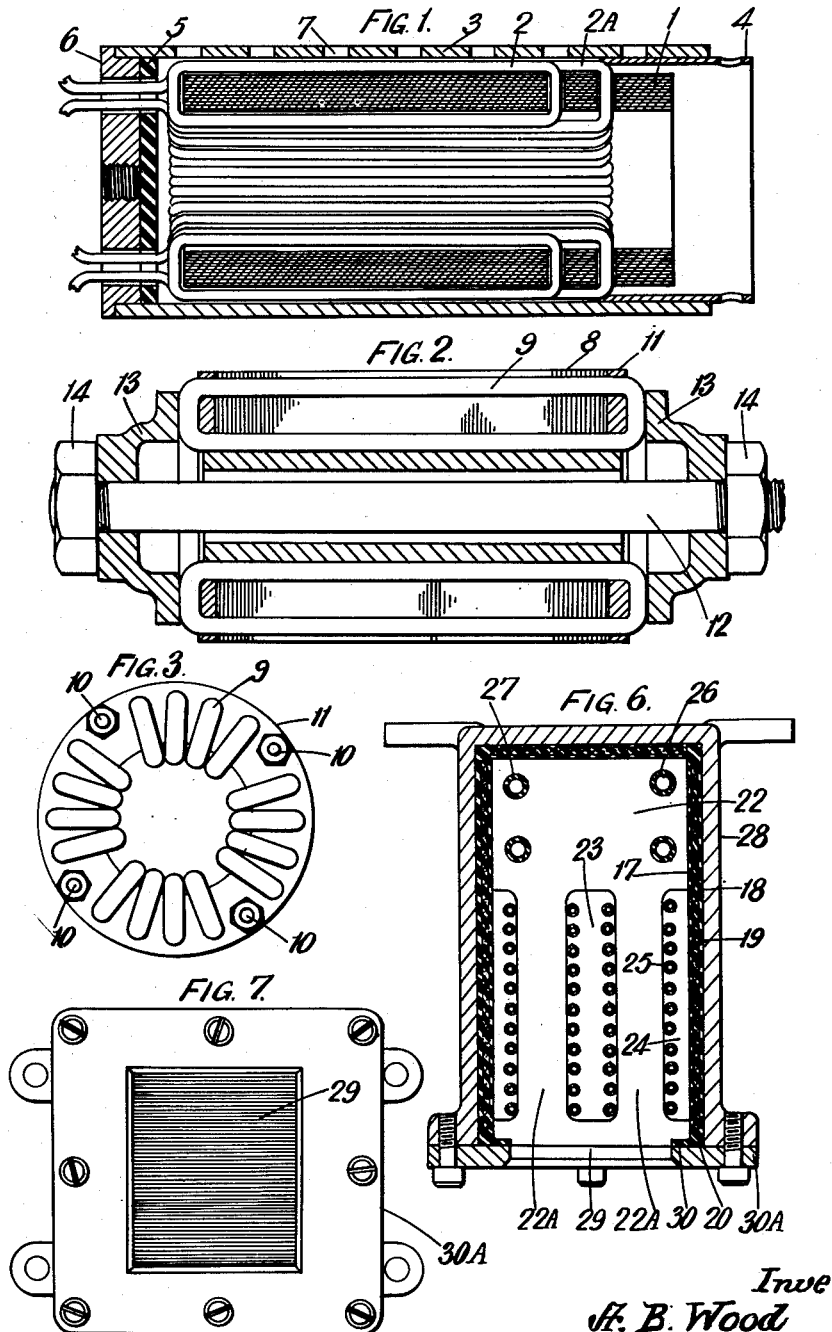

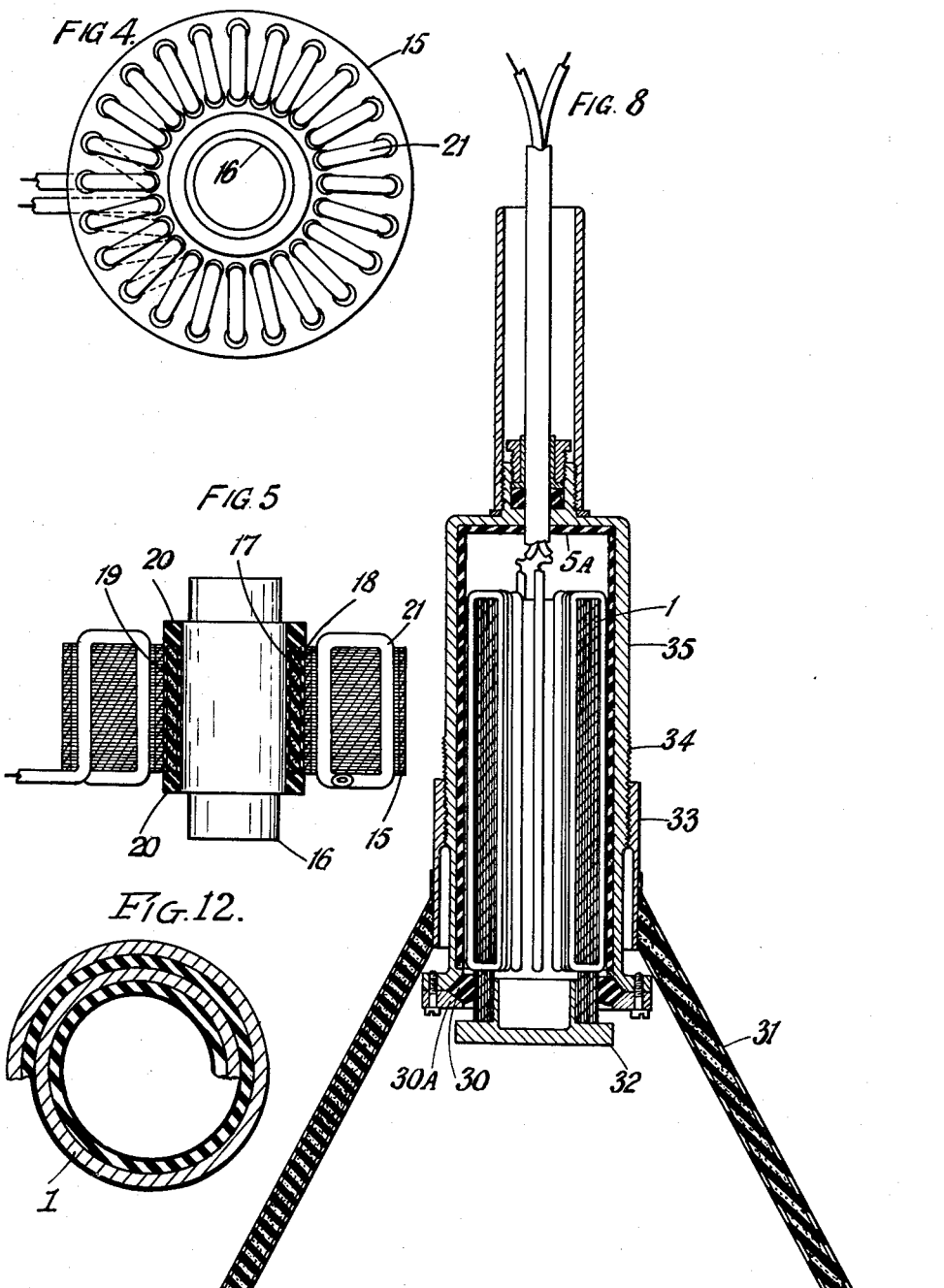

Patented Apr. 6, 1937

2,076,330

UNITED STATES PATENT OFFICE 2,076,330

MEASUREMENT OF DISTANCES BY ECHO RECEPTION METHODS

Albert Beaumont Wood, Frederick Daniel Smith, and James Andrews McGeachy, Teddington, England, assignors to Henry Hughes & Son Limited, London, England, a corporation of Great Britain Application January 26, 1932, Serial No. 589,036
In Great Britain March 18, 1931

4 Claims. (Cl. 177—386)

This invention relates to echo sounding apparatus, that is to say apparatus in which sound waves or acoustic impulses are transmitted and the time interval between transmission and reception of the echo is automatically measured, and the distance which is proportional to the time interval indicated and/or recorded by said apparatus. Typical examples of this class of apparatus are marine sounding apparatus, determination of height of aircraft, and horizontal distance of a reflecting object or surface from a transmitting and receiving station.

According to one form of echo sounding apparatus in use the transmitter comprises a diaphragm adapted to be set in vibration by being struck by a hammer and the receiver employs a microphone. This apparatus employs audible frequency. According to another form of apparatus the transmitter employs the piezo electric property of quartz. The frequency used is supersonic, that is to say a frequency above the higher audible limit.

The present invention relates more particularly to echo sounding apparatus in which frequencies approaching or beyond the higher audible limit are employed and one of the principal objects of the invention is the provision of a new or improved form of transmitter or receiver, and electrical circuits in association therewith.

A bar, rod, ring or the like of those metals or alloys which have the property of magnetostriction, when magnetized by a coil carrying electric current has its magnetization accompanied by a change both in length and in cross section which change varies with the degree of magnetization, and conversely if the bar, rod, ring or the like is continuously magnetized and subjected to mechanical stresses or vibrations, then electromotive forces are induced in an encircling winding.

Further a rod or the like of magnetostrictive material can be set into resonant longitudinal vibration by magnetizing it and placing it in an alternating magnetic field parallel to its length. The small magnetostrictive changes in the length of the rod alternate at the frequency of the magnetic field and when the frequency of alternation coincides with the natural frequency of the rod in longitudinal vibration, resonance occurs and a large increase in the amplitude of the vibration results. The phenomenon in this simple form is useless for the generation and reception of sound at supersonic frequencies for two reasons. In the first place, the eddy currents in the rod prevent the penetration of high frequency alternating magnetic fluxes and only a thin layer of the material on the outside is effective in producing vibrations. In the second place, the demagnetizing effect of the ends of the bar prevents the magnetic induction from reaching sufficiently high values.

According to the present invention the transmitting or receiving member is constructed of laminations of magnetostrictive material so arranged that the built up laminated member is capable of mechanical resonance at the required frequency by vibrating as a single resonating body. For transmission an alternating magnetization at the required frequency or an impulsive magnetization is applied to the said member to set up mechanical vibration to emit trains of acoustic waves or impulses, while for reception the received waves or impulses set up mechanical vibration in the member to induce an E. M. F. in an encircling winding.

A further feature of the invention resides in the laminated member being arranged to form a closed magnetic circuit.

A further feature of the invention resides in methods of excitation of the magnetostrictive member when used as a transmitter.

A further feature of the invention consists in combining with the magnetostrictive member when used as a transmitter or a receiver, a directive screening reflector.

The accompanying drawings illustrate constructions of apparatus embodying the present invention. Figure 1 shows in cross section one construction of a member for transmission or reception of high frequency sound vibrations. Figures 2 and 3 show in cross section and end elevation another construction of such member. Figures 4 and 5 show in end elevation and cross section, a further construction of such member. Figures 6 and 7 show in cross section and end elevation, a further construction of such member. Figure 8 shows in cross sectional elevation a construction in which the magnetostrictive member is combined with a directive reflector. Figures 9, 10, 11 show in cross sectional elevation typical arrangements for mounting the transmitter or receiver in a ship. Figure 12 is a transverse section taken through the magnetostrictive member.

The lamination of the magnetostrictive member may be provided by winding under tension a sheet or wire or wires (which term is meant also to include small diameter rods) of the magnetostrictive material on a roll or former, or the member may be built up of stampings, which may be consolidated into a block, or held under pressure, or may be relatively free.

The laminations or stampings can be consolidated into a solid body by providing between adjacent laminations or stampings, insulating and cementitious material, for example the successive laminations or stampings may be covered with a thin layer of insulating cement assembled with insulating layers of thin paper, or the insulating paper may be omitted, in which case the insulating cement provides both insulation and mechanical adhesion between the laminations or stampings. The cementitious material may conveniently be liquid or plastic during the manufacture of the member while acting as a solid body as regards its mechanical vibration after the member has been completed ready for use. Accordingly cement may be employed which is liquid or plastic at ordinary temperatures and which solidifies under heat with or without application of pressure, or a cement which may be solid at ordinary temperatures may be applied hot when it is liquid or plastic, and the assembled member then allowed to cool. To ensure consolidation of the laminated and cementitious layers, maintenance of tension in the rolled form or of pressure when stampings are employed is provided for during manufacture.

In another form of construction no attempt is made to consolidate the laminated members into a single body so that the laminations or stampings would be free to vibrate individually and independently. It is, however, essential with this form of construction to achieve a high degree of uniformity between the individual laminations or stampings, since if differences exist between them whether of dimensions, density or elastic properties, they will resonate in different frequencies so that the individual parts of the laminated member will not vibrate in synchronism with substantially the same amplitude and phase. The laminations or stampings in this form of construction may be covered with a suitable insulating and protecting layer and can be assembled in a loose pile on a former designed to support them in alignment with one another but not to apply any appreciable constraint. When the design conditions permit the use of relatively thick stampings, these may be mounted parallel to each other but not touching, a small gap between the adjacent stampings serving to restrict the flow of eddy currents and to promote cooling and dissipation of heat generated by eddy currents and hysteresis.

In yet a further form of construction the laminations or stampings which may be covered with a suitable insulating layer are placed on a former to bring them into alignment and pressed together with considerable force by pressure applied from bolts running normally to the plane of the stampings, which grip one another by the frictional forces between their flat faces and therefore vibrate together essentially as a single resonating member. The bolts may conveniently be placed inside or outside the stampings or through holes previously punched in the stampings, and may bear on stiff end plates so as to apply a uniform pressure over the end surfaces of the pile of stampings.

The typical forms above defined ensure a closed magnetic circuit. It is sometimes desirable also to provide for an initial steady magnetization, the closed magnetic circuit permitting of this magnetization being provided either by a small amount of continuous excitation or in some cases by the retentivity of the member when once it has been magnetized. Alternatively the effect of a steady magnetization on which an alternating magnetization is superposed may be produced by magnetizing the previously unmagnetized magnetostrictive member with an alternating magnetic field of half the frequency of the desired mechanical vibration. Or again the required type of magnetization may be produced by half wave or full wave rectified alternating current carried in a winding linking the magnetostrictive member, the rectified alternating current being derived from a sinusoidal alternating current supply of the same frequently or half the frequency of the desired mechanical vibration.

In constructing the magnetostrictive member it is advisable to ensure that there is no short circuiting at the ends or the periphery of the member, which can be treated in any suitable way to ensure this, as part of the constructional operation.

Referring now to Figure 1, a member vibrating longitudinally is obtained by winding tightly on a mandrel a long strip of nickel or other suitable magnetostrictive material, successive layers being insulated such as by thin paper and cemented together by suitable cementitious insulating material. The hollow cylinder 1 so obtained is provided with two sets of radial holes for toroidal windings 2, 2A of insulated wire. One of the windings is used to apply a steady magnetizing current while by the other winding is applied the alternating magnetization of the required frequency. The cylinder 1 is housed in a protecting shield 3 which may be of brass or other material of sufficient mechanical strength and provided with a hood 4 to retain the cylinder. A disc 5 of rubber mousse or other efficient reflector of sound waves is provided at one end of the protecting shield to prevent the emission of sound from that end of the member, the rubber mousse being retained in place by an end cap 6 secured to the shield. Holes 7 are provided for easy escape of air from the interior when the member is placed in water.

Referring now to Figures 2 and 3 which show a construction suitable for radial or transverse vibration, a pile of ring stampings is consolidated into the form of a hollow cylinder 8 and a toroidal winding 9 carries the necessary magnetizing currents. The winding passes through holes near the outer periphery of the stampings as will be seen from inspection of Figure 3. Some of these holes are reserved for compression bolts 10 bearing on the ends of the cylinder through the agency of suitable insulating caps 11. A central bolt 12, end caps 13 and nuts 14 support the cylinder lightly but firmly. Sound vibrations are emitted by the outer cylindrical surface of the pile of stampings.

Referring now to Figures 4 and 5, which illustrate a construction for radial or transverse vibration, a pile of ring stampings 15 is assembled on a former consisting of a supporting rod 16 on which is mounted a composite cylinder consisting of an inner layer of solid rubber 17, then an intermediate layer of cellular rubber 18 and finally an outer layer of solid rubber 19. The ends of the composite cylinder are sealed with rings 20 of hard rubber. By virtue of the enclosed intermediate layer of cellular rubber containing air or other gas, no emission of sound vibrations will take place from the inner periphery of the stampings.

The pile of stampings is toroidally wound for the application of the necessary magnetizing currents, the winding being indicated by 21. It will be observed that no constraint except for that imposed by the toroidal winding is shown applied to the assembled stampings but if desired the top and bottom faces of the pile may be provided with rings of insulating material connected together by bolts. These end rings really serve for protecting purposes. The stampings are prepared to be as far as possible identical as regards mechanical properties, magnetic properties and dimensions. Practical elimination of errors in manufacture can be obtained by taking the required number of stampings and ensuring a thorough redistribution of the order in which they were made.

Referring now to Figures 6 and 7 which illustrate another form of construction for longitudinal vibration, the member is composed of a pile of stampings 22 of rectangular form provided with a central aperture 23 and a peripheral groove 24. The member is thus formed with a pair of tuning legs 22A round which is a toroidal winding 25. As above stated the vibration is longitudinal and the smaller mass of the stampings at the emitting ends of the legs 22A vibrates with larger amplitude than the larger mass at the other ends of the stampings. The pile of stampings which may be covered with insulating material or oxidized to prevent conduction of eddy currents between the stampings are held and supported in alignment by bolts 26 insulated from the stampings by sleeves 27 of insulating material. The assembled stampings are mounted in a casing 28 which is shown having fitted within it a sound reflector of the construction described with reference to Figures 4 and 5, namely inner and outer layers of hard rubber 17 and 19 respectively with an intermediate layer 18 of spongy or cellular rubber with sealing end caps 20 of hard rubber. These reflectors prevent emission of sound vibrations from the vibrating stampings except from the emitting face 29 at the forward end of the tuning legs 22A. The assembled stampings are held within the casing 28 by a rubber washer 30 and clamping face plate 30A. Since the emitting end of the stampings are open to the water through the aperture in the face plate 30A, water has access to the interior, but by virtue of the sound reflecting packing provided sound vibrations can be emitted only from the end 29.

Referring now to Figure 8 which illustrates a convenient method of combining the magnetostrictive member with a directive reflector 31. The particular construction of magnetostrictive member illustrated is that previously described with reference to Figure 1, and the corresponding parts are indicated by the same reference numerals in both figures, although of course it is to be understood that the other constructions can be similarly arranged. As this construction is illustrated employing a member giving longitudinal vibration, the emitting end of the member is shown provided with an end tuning load 32. The reflector is air filled such as can be obtained by the employment of a double walled member containing air, rubber mousse or cellular rubber with the ends of the double walled member being sealed against admission of water. For example, reflectors can be constructed from an inner and outer layer of hard rubber and an intermediate layer of spongy rubber with end sealing caps of hard rubber as described with reference to Figures 4 and 5. As the position of the emitting face is important relatively to the reflector, the upper end of the reflector is shown as provided with an internal screw threaded extension 33 which can be adjusted along a screw threaded portion 34 of the housing 35 for the magnetostrictive member. The interior of the housing is provided with a sound reflecting layer which conveniently may be similar to that referred to with reference to Figures 6 and 7 and for convenience is indicated by 5A. Access of water to the housing 35 is prevented by a rubber washer 30 and clamping ring 30A.

Referring now to Figures 9, 10 and 11, which illustrate three typical ways of mounting the magnetostrictive member with the reflector into a ship. Figure 9 illustrates a magnetostrictive member constructed for radial vibration and with its directive reflector 31 mounted on an adjustable support 36. The magnetostrictive member and reflector thus move together and the unit is enclosed in a water or other liquid containing tank 37. The plate 37A of the tank may in some cases be constituted by the ship's plating, so that the tank 37 might constitute a water or oil fuel tank in the ship. Where this is not possible the tank may of course be made as a separate item and secured in the required position to the ship's hull.

By arranging the magnetostrictive member and its reflector as a unit supported on the adjustable support 36 adjustment can be made for the position of the unit with respect to the plate 37A to obtain the best distance for maximum sound transmission or reception.

Referring now to Figure 10, the reflector 31 forms a chamber with water or other liquid both in and outside the chamber. The magnetostrictive member is shown to be of the radially vibrating type and is mounted on a support 38 adjustable axially by means of a screw threaded rod 39 rotatably mounted in a fixed member 40. The end of the reflector 31 is shown spaced away from the ship's or other plating 37A. In this case the magnetostrictive member only is adjusted with respect to its distance from the plating 37A.

Referring now to Figure 11, the magnetostrictive member is of the radially vibrating type and is mounted similarly to the construction shown in Figure 10, the same reference numerals being employed for corresponding parts. In this arrangement, however, the reflector 31A itself constitutes the liquid containing tank in that the reflector 31A is bounded on its external surface by air. The reflector in this case may be a relatively thick walled reflector of metal or other suitable material of the required strength and is shown as provided with an aperture 41 and cap for filling the interior with liquid through a pipe 42. Of course instead of mounting the magnetostrictive member in a tank, it can be mounted in a trunk or well constructed in the ship and open or closed at its lower end to the sea.

In the constructions illustrated and above described, the vibration of the magnetostrictive member has been arranged to be radial, transverse or longitudinal under the effect of the alternating or impulsive magnetization applied. While the strictly radial or longitudinal vibration allows of compact constructions of the magnetostrictive member, it will be apparent that a transverse mode of vibration can be employed involving flexing and bending of the magnetostrictive member by arranging the alternating or impulsive magnetizing windings in such a manner that the stretching of one part of the member coincides with the contraction of another part and vice versa thereby developing forces tending to bend the member.

The constructions above described serve as transmitters or receivers, consequently one member may be used both for transmission of the impulses and reception of the echoes.

What we claim as our invention and desire to secure by Letters Patent is:—

1. A transmitting member for use in apparatus for the measurement of distance by echo reception, comprising a tubular core formed of laminations of magneto-strictive material disposed so that they vibrate in a direction parallel to the axis of the core, means for securing the laminations together to provide a single resonating body, sound insulating material disposed about the laminations to prevent the emission of sound waves from the curved face and one end of the core, a supporting housing co-axial with the core and surrounding the laminations and the sound insulating material, and a reflector co-axial with the core and housing and projecting beyond the end of the core from which emission of sound is permitted.

2. In apparatus for the measurement of distance by echo reception, a tank containing a body of liquid, a sound insulated reflector suspended adjustably in the body of liquid with the liquid in contact with the surface of the reflector from which the sound is reflected and with the outside of the reflector, and a magnetostrictive member within said reflector.

3. In apparatus for the measurement of distance by echo-reception, a magnetostrictive member, a housing therefor, a sound reflector in sound reflecting relation to said member, and sound insulation at the inside and end of said housing, said member having core laminations disposed so that they vibrate in a direction parallel to the axis of the core, housing and reflector, which axis they all have in common.

4. A transmitting member for use in apparatus for the measurement of distance by echo reception, comprising a tubular core of ring form laminations of magnetostrictive material disposed so that they vibrate in a direction transverse to the axis of the core, a support for said core and sound insulating means on said support to prevent the emission of sound waves from the inner curved face and one end of the core, a reflector co-axial with the core and support and in sound reflecting relation to the outer curved surface of the core, and a liquid within said reflector.

ALBERT BEAUMONT WOOD.
FREDERICK DANIEL SMITH.
JAMES ANDREWS McGEACHY.